United States Patent Office.

CONRAD SEMPER, OF PHILADELPHIA, PENNSYLVANIA, ASSIGNOR TO JOHN HARRISON, GEORGE L. HARRISON, JR., AND THOMAS S. HARRISON, ALL OF SAME PLACE.

PROCESS OF REMOVING IRON AND MANGANESE FROM CERTAIN SOLUTIONS.

SPECIFICATION forming part of Letters Patent No. 264,774, dated September 19, 1882.

Application filed February 3, 1882. (No specimens.)

*To all whom it may concern:*

Be it known that I, CONRAD SEMPER, of the city and county of Philadelphia, in the State of Pennsylvania, have invented a new and useful process of removing both the iron and manganese from certain solutions in which they are contained, of which the following is a full and exact description.

In an application for Letters Patent filed of even date herewith I have described and claimed a process of removing the iron from ferruginous solutions of certain salts by treating them with manganic dioxide or sesquioxide, and have also described and claimed in another application for Letters Patent of even date herewith the process of removing manganese from non-ferruginous solutions of certain salts by treating such solutions with a permanganate.

I have also discovered that if a ferruginous solution of such salts as are not decomposed by the permanganate in the operation of the process and which contain manganese is treated with a permanganate not only the manganese is precipitated by such treatment, but the manganic dioxide attracts the peroxide of iron, forming a chemical combination, and is precipitated jointly, leaving the solution, if the proper proportion should have been employed, free or almost free from both iron and manganese. If such a ferruginous solution should originally not contain any or not contain a sufficient quantity of manganous salt to give the proper reaction, a certain quantity of manganous salt must be added sufficient to jointly precipitate all or nearly all the iron with the manganic dioxide. In case the iron in the said solutions is present as ferrous oxide, part of the permanganate added for its removal will be consumed in its oxidation to ferric oxide, as the iron can only be precipitated by this process in this form.

The relative quantity of permanganate necessary to be used can be readily calculated by testing the amount of the manganic dioxide and iron present. I do not confine myself to any specific proportions; but care must be taken that enough manganese is present to precipitate the iron. In order to prevent any of the manganese or iron from remaining in solution, the solution must be as neutral as possible, and if it should be basic or slightly basic it will be of advantage. A ferruginous solution containing manganese may be thus treated either before or after the impurities other than organic impurities have been removed—as, for instance, a solution of sulphate of alumina need not have the silica or undecomposed raw material removed beforehand.

It is necessary that sufficient manganous salt be used so as to form, when oxidized with the permanganate, a manganic dioxide in the proportion of at least three to one of the ferric oxide present in the solution.

I will now describe the process in detail, taking a ferruginous solution of sulphate of alumina for convenience of explanation, although the process is the same in solutions of other salts not decomposed by a permanganate, such as solutions of salts of zinc, nickel, magnesia, soda, &c.

After the sulphuric acid and the aluminous raw material have acted upon each other and the action ceases, a sufficient quantity of water or mother-liquor from a previous operation is added to keep the solution from hardening. It is now tested to see whether the sulphate of alumina is neutral or not too sour, and if the latter is the case the necessary steps are taken to bring it to as nearly a neutral or basic state as possible. Then, provided there should not already be sufficient manganese present, a small but sufficient quantity of manganous salt, preferably manganous sulphate, is added. The whole mass is now well stirred, and, if the temperature is not sufficiently high for the chemical reaction to take place promptly, it is heated by means of a steam-coil or direct steam, or by any other suitable means, until this action begins. Then a portion of the permanganate solution is added, the mass kept in agitation, and after some time—say five or ten minutes—a sample is drawn. If the sample thus drawn shows iron or manganese in any considerable quantity, another portion of permanganate is added and the mass again stirred, and another sample drawn, and so on until a sample shows no iron or manganese, or only a small quantity of either or both. If a slight excess of permanganate should have been added, which can be readily seen by its color, it is only necessary to add a little more manganous salt, in which case the same action takes place, and both the manganese and iron are finally precipitated. The liquor is now ready for further treatment after the subsiding of the insoluble parts or removal of the same by any of the well-known means. The residue, consisting of silica, undecomposed raw material, manganic dioxide, and ferric oxide, has to be washed, and the weak solution of sulphate of alumina obtained thereby utilized in the next operation to prevent hardening of the solution of the sulphate of alumina. The silica and undecomposed raw material mixed with the manganic dioxide and ferric oxide from the above treatment can perhaps profitably be employed as a pigment, the sediment which I have obtained having a beautiful brown color. It will only be necessary after washing it to subject it to a floating process, by which all the coarse particles are removed, and to dry the fine particles collected therefrom. The clear solution of sulphate of alumina, which contains no iron or manganese, or only a small quantity of them, is now boiled down and run out to cool into a cake; or it can be utilized for crystal alum or for any other purpose it may be desired.

Having thus described my invention, what I claim as new, and desire to secure by Letters Patent, is—

1. The process of removing both the iron and manganese by a single operation from ferruginous solutions (of such salts as are not decomposed in the operation of the process) containing manganous salts by treating them with a permanganate and subjecting them to heat, substantially as described.

2. The addition to a ferruginous solution of any salt of the alkalies, alkaline earths, or metallic bases not decomposed by treatment with a permanganate, of a sufficient amount of manganous salt, if such be not previously present, to jointly precipitate the iron with the manganese by treating such solution with a permanganate and subjecting it to heat, substantially as described.

CONRAD SEMPER.

Witnesses:
CHARLES F. ZIEGLER,
J. WALTER DOUGLASS.